W. E. TAYLOR.
SOLDER FUSING MACHINE.
APPLICATION FILED OCT. 23, 1911.
1,144,510.
Patented June 29, 1915.
2 SHEETS—SHEET 2.
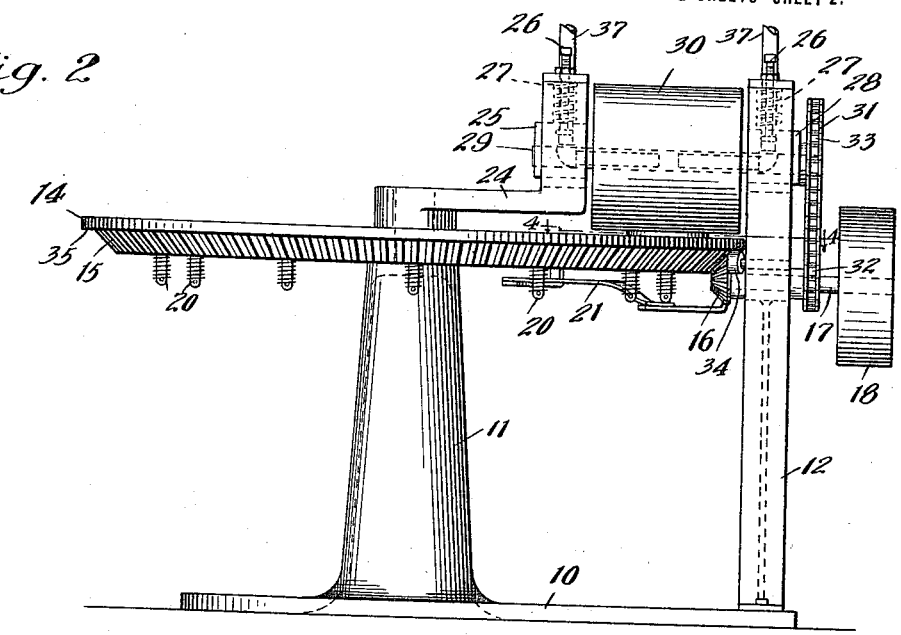
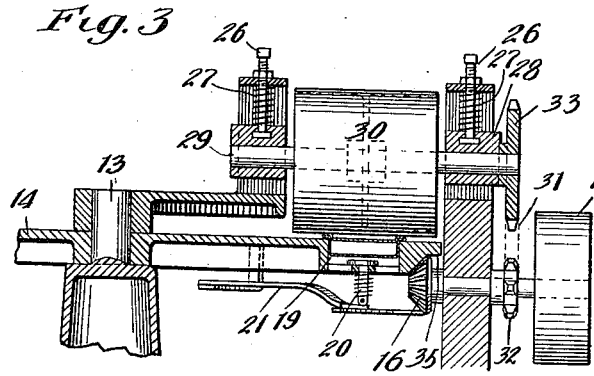
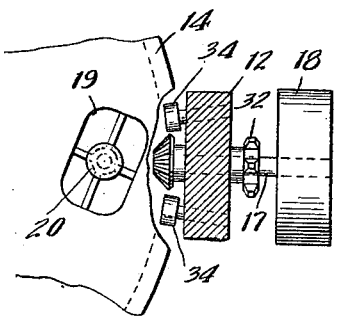
Witnesses:
Wm. Geiger
Inventor:
William E. Taylor
By Munday, Evarts, Adcock & Clarke.
Attys

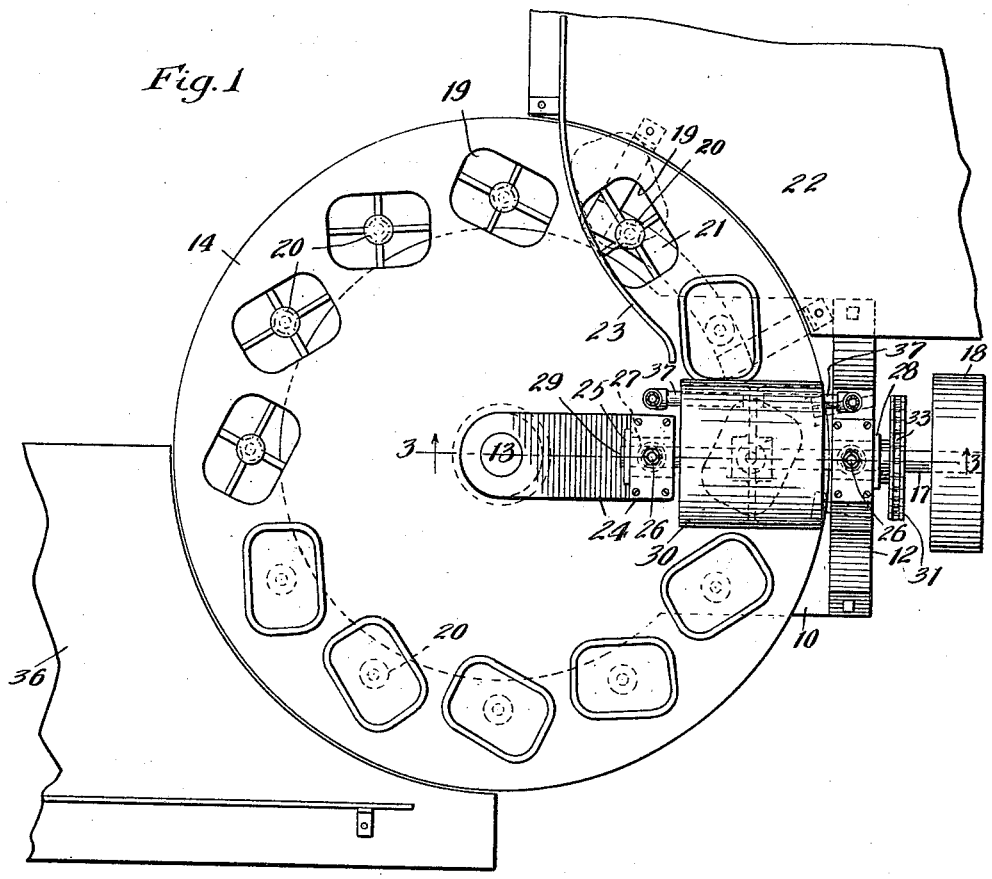

UNITED STATES PATENT OFFICE.

WILLIAM E. TAYLOR, OF EASTPORT, MAINE, ASSIGNOR TO AMERICAN CAN COMPANY, OF NEW YORK, N. Y., A CORPORATION OF NEW JERSEY.

SOLDER-FUSING MACHINE.

1,144,510.  Specification of Letters Patent.  Patented June 29, 1915.

Application filed October 23, 1911. Serial No. 656,208.

*To all whom it may concern:*

Be it known that I, WILLIAM E. TAYLOR, a citizen of the United States, residing in Eastport, in the county of Washington and State of Maine, have invented a new and useful Improvement in Solder-Fusing Machines, of which the following is a specification.

This invention relates to improvements in solder fusing machines.

The object of the invention is to provide a simple, compact and efficient machine adapted to solder heads or covers to can bodies, and relates more particularly to machines for applying heads or covers to drawn rectangular can bodies having the solder first applied to the body seaming flange and the cover flange tucked around the body flange, although my machine is equally as well adapted to operate on cans having a separate strip of solder applied between the cover and body flanges or on cans in which the solder is first applied to the cover flange.

Another object of my invention is to provide a soldering device which progressively fuses the seam, at the same time applying pressure on the seam during the fusing process, and a structure which will cause the heating or fusing roller to slip or draw along the seam after the manner of using a hand soldering iron, thus producing a uniform and a hermetically tight seam.

The machine which I have shown for accomplishing the desired results outlined above comprises essentially a table rotatable about a vertical axis, said table or carrier being provided with a plurality of can body pockets spaced circumferentially on the table, a combined fusing and pressure roller arranged radially of the rotatable carrier and adapted to fuse and press the seams of the can bodies as they are passed under said roller successively by the carrier, and my invention furthermore comprises means for positively rotating the carrier and the roller, means for ejecting cans from the carrier and a device for deflecting the ejected cans to a table adjacent thereto.

My invention furthermore consists in the improvements in the parts and devices and in the combinations of the parts and devices herein shown, described and claimed.

In the drawing forming a part of this specification, Figure 1 is a plan view of a machine embodying my improvements. Fig. 2 is a side elevation of the same. Fig. 3 is a partial, vertical section taken on the line 3—3 of Fig. 1 looking in the direction of the arrows and Fig. 4 is a detail, horizontal section taken on the line 4—4 of Fig. 2, a part of the table being broken away to more clearly show the parts.

In the drawing 10 represents any suitable base provided with upright standards 11 and 12, the standard 11 having at its upper end a cylindrical shaft portion 13 on which is rotatably mounted the rotary carrier or table 14. The carrier 14 serves also as a pressure device and is provided on its underside preferably with a beveled rack 15 by which the same is adapted to be rotated by means of the bevel gear 16 meshing therewith, said gear 16 being keyed to the shaft 17, the latter being mounted in the upright 12 and driven from any suitable source of power by means of a belt pulley 18. The rotary table or carrier 14 is provided with a plurality of spaced can body pockets 19 adapted to conform in shape and size to the cans to be operated upon, said pockets being preferably arranged so as to present the cans cornerwise or diagonally under the fusing and pressure roller. These pockets are arranged substantially circumferentially of the table 14 and all equally distant from the axis of rotation of the table. Each of the pockets 19 is provided with a spring pressed ejector 20, said ejector 20 being operated by a stationary cam 21 rigidly supported by the receiving table 22 and also attached to the table 22 and projecting over the rotary table and in line with the pockets 19 is a deflecting plate 23, said plate 23 being adapted to move the can bodies from the rotary carrier as they are ejected from the pockets 19.

Mounted upon the upper end of the shaft member 13 is a journal bearing standard 24 in which is slidably mounted a journal bearing 25 said journal bearing 25 being adjustably and resiliently mounted in said standard as by means of a screw 26 and spring 27. Mounted in the upper portion of the standard 12 is another bearing 28 similar to 25 and also adjustably and resiliently mounted as by means of a bolt 26 and spring 27. Mounted within the journal bearings 25 and 28 is a shaft 29 supporting a fusing and pressure roller 30 disposed above and in line with the can body pockets 19 as they are rotated thereunder, said roller being heated as by means of gas jets 37. The shaft 29 which is disposed radially of the rotary table 14 is preferably positively driven as by means of a sprocket chain 31 meshing with a sprocket gear 32 on the shaft 17 and a sprocket gear 33 keyed to the shaft 29.

In order to relieve the strain on the table or rotary carrier as the can bodies are passed under the fusing roller 33 I preferably provide anti-friction supporting rollers 34 mounted in any suitable manner in the standard 12, said rollers 34 engaging an annular flat portion 35 on the underside of the rotary table 14. In operation the can bodies with the covers applied thereto are fed from the supply table 36 into the can body pockets 19 and are then conveyed beneath the fusing roller 30 after which they are ejected and deflected on to the table 22. Since the surface speed of the roller is constant at all points thereon and the speed of the seam on the can bodies being operated upon varies according to the distance of the different portions of the seam from the center of rotation, it will be apparent that a differential or slipping or drawing movement of the fusing roller on the seam during the fusing operation will result which produces the effect caused by drawing a hand soldering tool or device over a seam, and therefore with the structure which I have disclosed the seams will be progressively fused and set and at the same time a drawing action of the fusing roller on the seam produced.

Many changes may be made in the various details and parts of my device without departing from the spirit of the invention and all such changes are contemplated as come within the scope of the appended claims.

I claim:—

1. In a machine of the character described, the combination of a rotatable table adapted to support cans to be soldered and having means for receiving said cans and holding them from movement on the table, and a fusing device arranged above said table and over the path of travel of the can bodies while they are supported by the table, and adapted to progressively fuse the seams of the can bodies as they pass by and in contact with the said fusing device.

2. In a machine of the character described, the combination with a rotatable table adapted to support a can body, of a fusing roller disposed above said table and having its axis radially arranged relatively to said table and adapted to progressively fuse the seam in the can body as it is conveyed thereunder by the table.

3. In a machine of the character described, the combination with a rotary table provided with a pocket in its upper face adapted to receive a can body, of a combined pressure and fusing device disposed above said table and over the path of travel of the can body while supported by the table and adapted to progressively fuse and press the seam, substantially as specified.

4. In a machine of the character described, the combination with a rotary table provided with a plurality of pockets shaped to conform to and adapted to receive can bodies, of a fusing roller supported above said table and having its axis arranged radially of the table, and means for rotating said table, substantially as specified.

5. In a machine of the character described, the combination with a table rotatable about a vertical axis and having a plurality of can body pockets therein, arranged concentrically with said axis said table serving as a pressure device, of a combined heated fusing and pressure roller adjacent said table and having its axis arranged radially relative to the table, and means for positively rotating the roller, substantially as specified.

6. In a machine of the character described, the combination with a table rotatable about a vertical axis, and provided with a plurality of circumferentially disposed can body pockets, of a fusing roller disposed above said table and having its axis radially disposed relatively to the rotary table, and means for rotating the table, and means for rotating the roller, substantially as specified.

7. In a machine of the character described, the combination with a rotary table provided with a plurality of can body pockets, each of said pockets being provided with an ejector, of a cam for operating said ejectors, a combined fusing and pressure roller radially disposed relatively to said table and beneath which the pockets are adapted to pass, and means for rotating said table and said roller, substantially as specified.

8. In a machine of the class described, the combination with a rotary table provided with a plurality of rectangular can body pockets, of a combined fusing and pressure roller disposed above said table and having its axis radially arranged relatively to said table, and means for rotating said table and said roller, said pockets being arranged so as to present the cans cornerwise to the fusing roller, substantially as specified.

9. In a can soldering machine, the combination with a table rotatable about a vertical axis, said table being provided with a plurality of can body pockets, of a fusing roller radially arranged relatively to said rotary table, means for rotating the table and the roller, each of said pockets being provided with an ejector, a stationary table adjacent the rotary table, said stationary table having mounted thereon a cam for operating the ejectors and having also a deflector attached thereto, substantially as specified.

10. In a machine of the class described, the combination with a movable can body supporting device, of a combined fusing and pressure roller, said device and roller being so arranged that a can body is conveyed adjacent to said roller in such a way that the different portions of the seam are moved past the roller at different speeds thereby producing a slipping or sliding movement of the roller on the seam, substantially as specified.

11. In a machine of the class described, the combination with a rotary table provided with a plurality of rectangular can body pockets, said table serving as a pressure device while the can seams are being fused, of a combined fusing and pressure roller disposed above said table, said pockets being arranged so as to present the cans cornerwise or diagonally to the fusing roller whereby different portions of the seam are moved past the roller at different speeds thereby producing a slipping or sliding movement of the roller on the seam during the fusing operation, substantially as specified.

WILLIAM E. TAYLOR.

Witnesses:
WILLIAM J. WILSON,
ETHEL E. FERSON.

Copies of this patent may be obtained for five cents each, by addressing the "Commissioner of Patents, Washington, D. C."